(12) United States Patent
Kuriyama et al.

(10) Patent No.: US 9,266,485 B2
(45) Date of Patent: Feb. 23, 2016

(54) VEHICLE BODY FRONT STRUCTURE

(71) Applicant: Toyota Jidosha Kabushiki Kaisha, Toyota-shi, Aichi-ken (JP)

(72) Inventors: Tomoyuki Kuriyama, Toyota (JP); Kosuke Sakakibara, Toyota (JP); Akihiro Tamaoki, Tajimi (JP); Masanobu Omi, Kasugai (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 14/289,227

(22) Filed: May 28, 2014

(65) Prior Publication Data
US 2014/0361561 A1    Dec. 11, 2014

(30) Foreign Application Priority Data

Jun. 11, 2013    (JP) .................................. 2013-123081

(51) Int. Cl.
*B62D 21/15*    (2006.01)
*B62D 25/08*    (2006.01)
*B60R 19/34*    (2006.01)

(52) U.S. Cl.
CPC ............... *B60R 19/34* (2013.01); *B62D 21/15* (2013.01); *B62D 25/08* (2013.01)

(58) Field of Classification Search
CPC  B60R 19/34; B60R 19/2021; B60R 19/0004; B60R 19/0009; B60R 19/0023; B60R 19/0025; B62D 21/15; B62D 21/152; B62D 25/08

USPC ............. 293/132, 133, 154, 155; 296/187.04, 296/187.09, 187.1, 203.02
See application file for complete search history.

(56) References Cited

U.S. PATENT DOCUMENTS

| | | | | |
|---|---|---|---|---|
| 6,957,846 | B2 * | 10/2005 | Saeki | 296/187.1 |
| 8,419,116 | B2 * | 4/2013 | Boettcher et al. | 296/203.02 |
| 8,764,104 | B2 * | 7/2014 | Kihara et al. | 296/193.09 |
| 8,807,632 | B2 * | 8/2014 | Ramoutar et al. | 296/187.09 |
| 8,915,025 | B2 * | 12/2014 | Laflamme et al. | 52/85 |
| 8,919,835 | B1 * | 12/2014 | Han et al. | 293/133 |
| 2012/0248820 | A1 * | 10/2012 | Yasui et al. | 296/187.09 |
| 2013/0099514 | A1 * | 4/2013 | Kaneko et al. | 293/133 |
| 2013/0328334 | A1 * | 12/2013 | Hoiss et al. | 293/154 |
| 2014/0008924 | A1 * | 1/2014 | Han et al. | 293/133 |
| 2014/0361561 | A1 * | 12/2014 | Kuriyama et al. | 293/133 |
| 2015/0028606 | A1 * | 1/2015 | Eckert et al. | 293/133 |

FOREIGN PATENT DOCUMENTS

| | | |
|---|---|---|
| JP | 2006-137373 A | 6/2006 |
| JP | 2008-213739 A | 9/2008 |
| JP | 2009-248603 A | 10/2009 |

(Continued)

*Primary Examiner* — Gregory Blankenship
(74) *Attorney, Agent, or Firm* — Dinsmore & Shohl LLP (57) ABSTRACT

A vehicle body front structure includes a front side member that is arranged on a side portion of a vehicle body front portion and extends in a vehicle body front-rearward direction; an extending portion that extends farther toward an outside in a vehicle width direction than the front side member; and a load transmitting member that connects the extending portion and the front side member together, and is configured such that a pushing portion on a front end side is guided toward a receiving portion on a rear end side by an intermediate portion deforming in response to a frontal collision load.

5 Claims, 4 Drawing Sheets

(56) References Cited

FOREIGN PATENT DOCUMENTS

| | | | |
|---|---|---|---|
| JP | 2010-158954 A | 7/2010 |
| JP | 2011-111036 A | 6/2011 |
| JP | 4691964 B2 | 6/2011 |
| JP | 2012-228907 A | 11/2012 |

\* cited by examiner

VEHICLE BODY FRONT STRUCTURE

INCORPORATION BY REFERENCE

The disclosure of Japanese Patent Application No. 2013-123081 filed on Jun. 11, 2013 including the specification, drawings and abstract is incorporated herein by reference in its entirety.

BACKGROUND OF THE INVENTION

1. Field of the Invention

The invention relates to a vehicle body front structure.

2. Description of Related Art

Japanese Patent Application Publication No. 2012-228907 (JP 2012-228907 A), for example, describes a vehicle body front structure that includes a side protruding member that protrudes outward in a vehicle width direction from a front side frame, and a rear protruding member that protrudes rearward in a vehicle body front-rearward direction from a bumper beam extension member provided on an end portion of a bumper beam.

With the technology described in JP 2012-228907 A, a frontal collision load is input to the bumper beam extension member when a vehicle frontal collision farther to the outside than the front side frame in the vehicle width direction (hereinafter, this type of collision will be referred to as a "short overlap collision") occurs. When the bumper beam extension member deforms toward the rear in the vehicle body front-rearward direction, the rear protruding member abuts against the front protruding member, and a frontal collision load is transmitted to the front side frame via the side protruding member.

However, with the technology described in JP 2012-228907 A, depending on the collision angle and the like of a colliding object with respect to the front of the vehicle, the rear protruding member may not abut against the side protruding member, so the collision load may not be able to be transmitted from the rear protruding member to the front side member.

SUMMARY OF THE INVENTION

The invention provides a vehicle body front structure capable of transmitting a frontal collision load to a front side member when a short overlap collision occurs.

One aspect of the invention relates to a vehicle body front structure that includes a front side member that is arranged on a side portion of a vehicle body front portion, and extends in a vehicle body front-rearward direction; an extending portion that extends farther toward an outside in a vehicle width direction than the front side member; and a load transmitting member that connects the extending portion and the front side member together, and is configured such that a front end side of the load transmitting member is guided toward a rear end side of the load transmitting member by an intermediate portion of the load transmitting member deforming in response to a load toward a rear side in the vehicle body front-rearward direction.

According to the vehicle body front structure of this aspect of the invention, the front side member is connected to the extending portion that extends farther toward the outside in the vehicle width direction than the front side member, by the load transmitting member. Then, when a load toward the rear in the vehicle longitudinal direction (hereinafter referred to as a "frontal collision load") is input to the load transmitting member via the extending portion when a short overlap collision occurs, the intermediate portion of the load transmitting member deforms such that the front end side of the load transmitting member is guided toward the rear end side of the load transmitting member. As a result, the front end side of the load transmitting member will tend to abut against the rear end side of the load transmitting member. When the front end side of the load transmitting member abuts against the rear end side of the load transmitting member, the frontal collision load is transmitted to the front side member via the load transmitting member.

Thus, with the vehicle body front structure, a frontal collision load is able to be transmitted to the front side member when a short overlap collision occurs.

In the vehicle body front structure, a weak portion that becomes a starting point for deformation is formed on a portion on the outside, in the vehicle width direction, of the intermediate portion of the load transmitting member.

With the vehicle body front structure, when a frontal collision load toward the rear in the vehicle body front-rearward direction is input to the load transmitting member via the extending portion when a short overlap collision occurs, the intermediate portion of the load transmitting member deforms with the weak portion as the starting point. As a result, the front end side of the load transmitting member is guided toward the rear end side of the load transmitting member, and thus tends to abut against this rear end side.

According to the vehicle body front structure, the front end side of the load transmitting member is able to be made to abut against the rear end side of the load transmitting member when a short overlap collision occurs, by a simple structure in which a weak portion is formed on an intermediate portion of the load transmitting member.

In the vehicle body front structure, the rear end side of the load transmitting member may be positioned to the rear side in the vehicle body front-rearward direction, and to an inside in the vehicle width direction, with respect to the front end side of the load transmitting member.

According to the vehicle body front structure, the rear end side of the load transmitting member is positioned to the rear side in the vehicle body front-rearward direction, and to an inside in the vehicle width direction, with respect to the front end side of the load transmitting member. Therefore, when the intermediate portion of the load transmitting member deforms and the front end side of the load transmitting member is guided toward the rear end side of the load transmitting member when a short overlap collision occurs, the front end side abuts against the rear end side toward the rear side in the vehicle body front-rearward direction and toward the inside in the vehicle width direction. As a result, the front side member is pushed toward the inside in the vehicle width direction.

According to the vehicle body front structure, the vehicle body front portion is able to be made to move (slide) away from the colliding object in the vehicle width direction when a short overlap collision occurs.

In the vehicle body front structure, a receiving portion may be provided on the rear end side of the load transmitting member, a pushing portion that is guided toward the receiving portion may be provided on the front end side of the load transmitting member, and the pushing portion may push the receiving portion toward an inside in the vehicle width direction.

According to the vehicle body front structure, when the front end side of the load transmitting member abuts against the rear end side of the load transmitting member when a short overlap collision occurs, the pushing portion on the front end side pushes the receiving portion on the rear end side toward the inside in the vehicle width direction. As a result, the front side member is pushed toward the inside in the vehicle width direction.

With the vehicle body front structure, compared to a structure in which the pushing portion and the receiving portion are not provided, the vehicle body front portion is able to be made to move (slide) away from the colliding object in the vehicle width direction when a short overlap collision occurs.

In the vehicle body front structure, the load transmitting member may be a closed sectional structure, and the receiving portion and the pushing portion may be a reinforcing member provided inside the load transmitting member.

According to the vehicle body front structure, the load transmitting member is a closed sectional structure. A reinforcing member as the receiving member is provided inside, on the rear end side, of this load transmitting member, and a reinforcing member as the pushing portion is provided inside, on the front end side, of the load transmitting member. Then when the reinforcing member on the front end side abuts against the reinforcing member on the rear end side when a short overlap collision occurs, the frontal collision load is transmitted to the front side member via the load transmitting member.

According to the vehicle body front structure, a frontal collision load is able to be transmitted to the front side member via the reinforcing member, by a simple structure in which a reinforcing member is provided inside, on the front end side and the rear end side, of the load transmitting member.

Another aspect of the invention relates to a vehicle body front structure that includes a front side member that is arranged on a side portion of a vehicle body front portion, and extends in a vehicle body front-rearward direction; an extending portion that extends farther toward an outside in a vehicle width direction than the front side member; and a load transmitting member that connects the extending portion and the front side member together, a weak portion that becomes a starting point for deformation being formed on a portion on an outside, in the vehicle width direction, of an intermediate portion of the load transmitting member.

According to the vehicle body front structure of this aspect of the invention, the front side member is connected to the extending portion that extends farther toward the outside in the vehicle width direction than the front side member, by the load transmitting member. The weak portion that becomes the starting point for deformation is formed on a portion on an outside, in the vehicle width direction, of an intermediate portion of the load transmitting member.

Here, when a frontal collision load toward the rear in the vehicle body front-rearward direction is input to the load transmitting member via the extending portion when a short overlap collision occurs, the intermediate portion of the load transmitting member deforms with the weak portion as the starting point. The frontal collision load is able to be transmitted to the front side member via the load transmitting member, by deforming the intermediate portion of the load transmitting member by this weak portion, such that the front end side of the load transmitting member abuts against the rear end side of the load transmitting member.

According to the vehicle body front structure, a frontal collision load is able to be transmitted to the front side member when a short overlap collision occurs.

In the vehicle body front structure, the extending portion is provided on a bumper reinforcement that is arranged on a vehicle body front end side and extends in the vehicle width direction.

According to this vehicle body front structure, a frontal collision load is promptly input to the extending portion when a short overlap collision occurs, by providing the extending portion on the bumper reinforcement that is arranged on the vehicle body front end side.

According to this vehicle body front structure, a front collision load is able to be promptly input to the front side member when a short overlap collision occurs.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

A vehicle body front structure according to one example embodiment of the invention will now be described with reference to the accompanying drawings. In the drawings, arrow UP indicates an upward direction with respect to the vehicle, arrow FR indicates a forward direction with respect to the vehicle, and arrow OUT indicates an outside (vehicle body left side) in a vehicle width direction.

Figure 1:
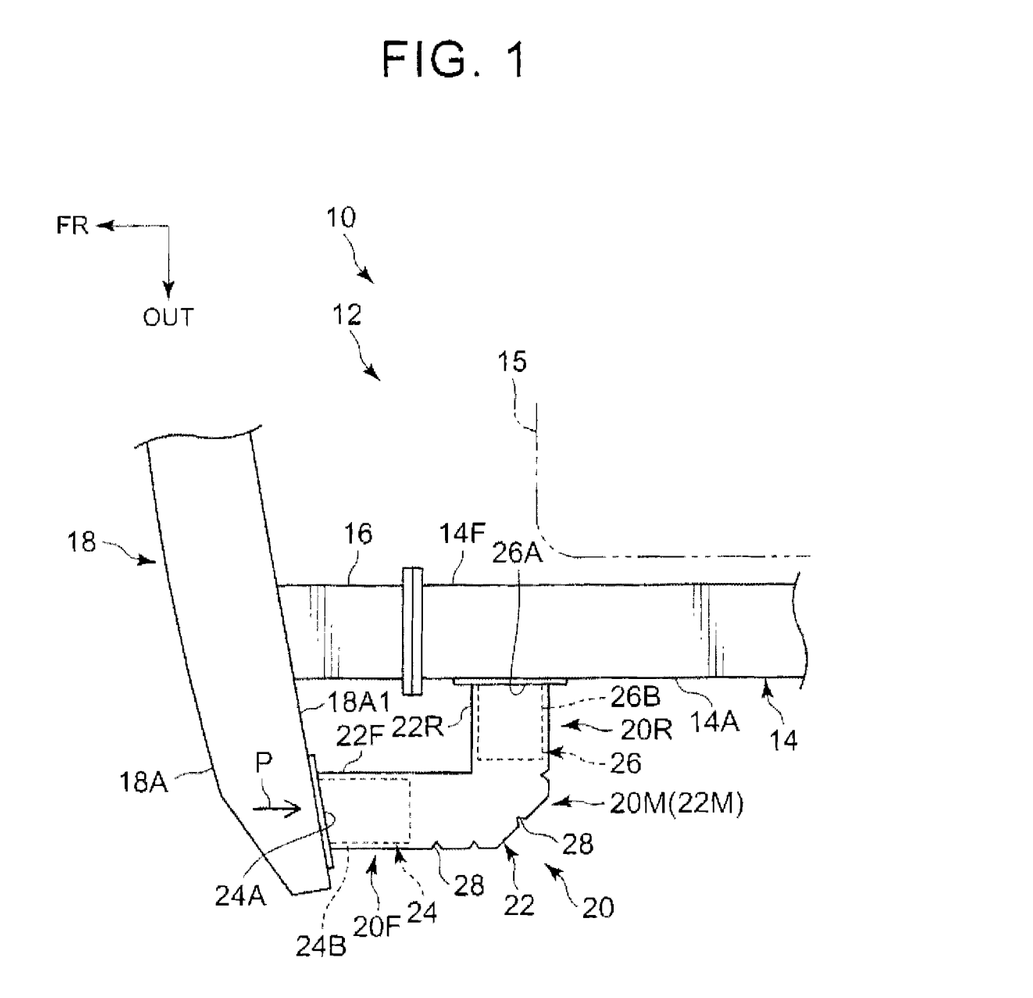
FIG. 1 is a plan view of a vehicle body front portion to which a vehicle body front structure according to one example embodiment of the invention is applied.

FIG. 1 is a view of a vehicle body front portion 12 to which a vehicle body front structure 10 according to the example embodiment is applied. The vehicle body front structure 10 includes a pair of front side members 14 arranged one on each side of the vehicle body front portion 12, and a front bumper reinforcement 18 arranged on a front end side of the vehicle body front portion 12. The vehicle body front portion 12 is formed bilaterally symmetrical with respect to a center portion thereof in the vehicle width direction. Therefore, below, only the structure of the left half of the vehicle body front structure 10 will be described. A description of the structure of the right half of the vehicle body front structure 10 will be omitted.

The front side members 14 are frame members that form the frame of the side portions of the vehicle body front portion 12, and are arranged one on each side of a power unit 15 that serves as a driving source. The power unit 15 is a driving source that rotatably drives at least a front wheel (not shown) of a vehicle, and includes at least one of an engine that is an internal combustion engine, and an electric motor. This power unit 15 is supported by the pair of front side members 14 via a mounting bracket, not shown. A cabin (passenger compartment), not shown, is formed across from a dash panel to the rear side of the power unit 15 in the vehicle body front-rearward direction.

Each front side member 14 extends in the vehicle body front-rearward direction and has a closed sectional shape when viewed from the vehicle body front-rearward direction. A cylindrical crush box 16 that absorbs impact energy by axially compression-deforming when a frontal collision occurs, is provided on a front end portion 14F of this front side member 14 in the vehicle body front-rearward direction.

The front bumper reinforcement (hereinafter, also simply referred to as "bumper reinforcement") 18 is arranged on a front side of the pair of front side members 14 in the vehicle body front-rearward direction. The bumper reinforcement 18 extends in a vehicle width direction and has a closed sectional shape when viewed from the vehicle width direction. The front end portions 14F of the pair of front side members 14 are joined, via the crush box 16 described above, one to each side of the bumper reinforcement 18 in the vehicle width direction. Also, both end portions of the bumper reinforcement 18 in the vehicle width direction are extending portions 18A that extend farther to the outside than the pair of front side members 14 in the vehicle width direction.

The extending portion 18A of the bumper reinforcement 18 and the front end portion 14F of the front side member 14 is connected by a load transmitting member 20. The load transmitting member 20 includes a connecting member 22, a front bracket 24 provided on a front end side of the connecting member 22, and a rear bracket 26 provided on a rear end side of the connecting member 22.

The connecting member 22 is a closed sectional structure that is formed in a cylindrical shape with a generally rectangular cross-section by a steel sheet or the like, and is bent in a general L-shape when viewed from above. A front end portion 22F of this connecting member 22 is fixed to the extending portion 18A of the bumper reinforcement 18 via the front bracket 24, and a rear end portion 22R of the connecting member 22 is fixed to the front side member 14 via the rear bracket 26.

Figure 2:
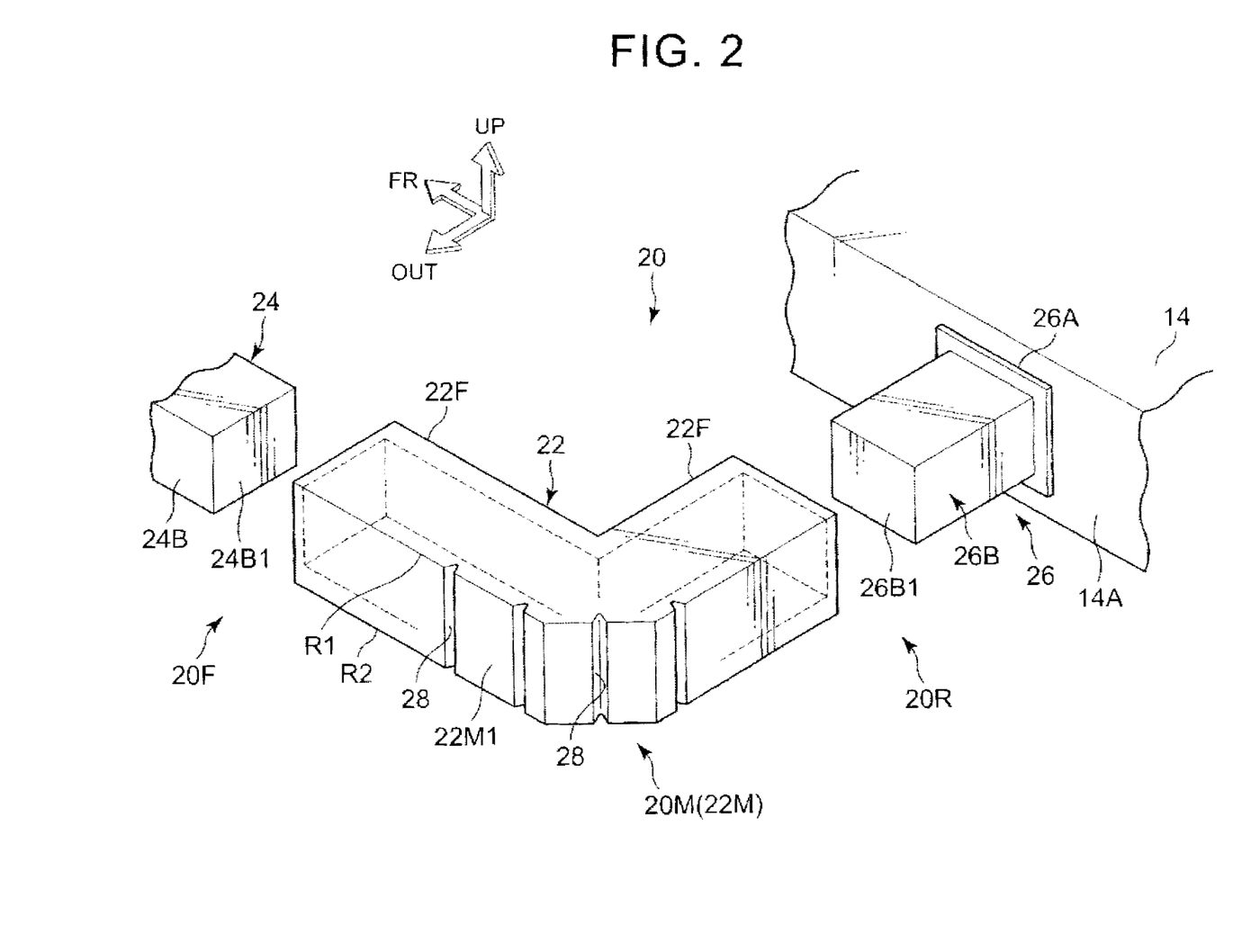
FIG. 2 is an exploded perspective view of a load transmitting member shown in FIG. 1.

As shown in FIGS. 1 and 2, the front bracket 24 has a front flange portion 24A (see FIG, 1) that is fixed to the extending portion 18A of the bumper reinforcement 18, and a front protruding portion 24B that is joined to the front end portion 22F of the connecting member 22. The front flange portion 24A is formed in a plate shape by a steel sheet or the like, and is fixed to the extending portion 18A of the bumper reinforcement 18 by welding or the like in a state overlapping with a rear wall portion 18A1 of the extending portion 18A.

The front protruding portion 24B as one example of a reinforcing member protrudes toward the rear in the vehicle body front-rearward direction from the front flange portion 24A. This front protruding portion 24B is formed in a cylindrical shape with a generally rectangular cross-section by a steel sheet or the like. Also, a tip end portion of the front protruding portion 24B in the protruding direction (i.e., an end portion on the side opposite the extending portion 18A) is closed off by a wall portion 24B1 (see FIG, 2). As a result, the rigidity of the tip end portion of the front protruding portion 24B is increased.

The front protruding portion 24B is inserted into (i.e., fit into) the front end portion 22F of the connecting member 22, and joined to the front end portion 22F by welding or the like. A pushing portion 20F that has a higher rigidity than an intermediate portion 20M in the vehicle body front-rearward direction is formed on a front end side of the load transmitting member 20, by reinforcing the front end portion 22F of the connecting member 22 with this front protruding portion 24B.

The rear bracket 26 has a rear flange portion 26A that is fixed to the front side member 14, and a rear protruding portion 26B that is joined to the rear end portion 22R of the connecting member 22. The rear flange portion 26A is formed in a plate-shape by steel sheet or the like, and is fixed to the front side member 14 by welding or the like in a state overlapping with an outside wall portion 14A of the front side member 14, which is on the outside of the front side member 14 in the vehicle width direction.

The rear protruding portion 26B that is one example of a reinforcing member protrudes toward the outside in the vehicle width direction from the rear flange portion 26A, and is positioned to the rear in the vehicle body front-rearward direction, and to the inside in the vehicle width direction, with respect to the front protruding portion 24B. This rear protruding portion 26B is formed in a cylindrical shape with a generally rectangular cross-section by a steel sheet or the like. Also, a tip end portion of the rear protruding portion 26B in the protruding direction (i.e., an end portion on the side opposite the front side member 14) is closed off by a wall portion 26B1 (see FIG. 2). As a result, the rigidity of the tip end portion of the rear protruding portion 26B is increased.

The rear protruding portion 26B is inserted into (i.e., fit into) the rear end portion 22R of the connecting member 22, and joined to the rear end portion 22R by welding or the like. A receiving portion 20R that has a higher rigidity than the intermediate portion 20M is formed on a rear end side of the load transmitting member 20, by reinforcing the rear end portion 22R of the connecting member 22 with this rear protruding portion 26B.

Here, the intermediate portion 20M of the load transmitting member 20 is formed by an intermediate portion 22M of the connecting member 22 in the vehicle body front-rearward direction. A plurality of longitudinal beads 28 as one example of a plurality of weak portions are formed on a portion on the outside (i.e., an outside portion) of the intermediate portion 22M of this connecting member 22 in the vehicle width direction. More specifically, a plurality of longitudinal beads 28 are formed spaced apart in the axial direction of the connecting member 22, on an outside wall portion 22M1 that is on the outside in the vehicle width direction of the intermediate portion 22M of the connecting member 22.

Each longitudinal bead 28 extends in the vehicle vertical direction, and is formed between upper and lower edge line portions R1 and R2 of the outside wall portion 22M1. These longitudinal beads 28 make the rigidity of an outside portion of the intermediate portion 20M of the connecting member 22 in the vehicle width direction lower than the rigidity of an inside portion of the intermediate portion 20M of the connecting member 22 in the vehicle width direction.

As a result, when a frontal collision load P toward the rear in the vehicle body front-rearward direction is input to the front end portion of the load transmitting member 20, the intermediate portion 20M of the load transmitting member 20 will deform (crumple) such that the pushing portion 20F abuts against (i.e., strikes) the receiving portion 20R. In other words, when the frontal collision load P is input to the front end portion of the load transmitting member 20, the intermediate portion 20M of the load transmitting member 20 will deform (crumple) with the longitudinal beads 28 as the starting point, such that the pushing portion 20F is guided toward the receiving portion 20R, and abuts against the receiving portion 20R.

Next, the operation of this example embodiment will be described.

According to the vehicle body front structure 10 of this example embodiment, the extending portion 18A of the bumper reinforcement 18 and the front side member 14 are connected by the load transmitting member 20. This load transmitting member 20 has the pushing portion 20F provided on the front end side, and the receiving portion 20R provided on the rear end side. Also, the plurality of longitudinal beads 28 are formed on the outside wall portion 22M1 of the intermediate portion 20M (i.e., the intermediate portion 22M) of the load transmitting member 20. Thus, the outside portion of the intermediate portion 20M of the load transmitting member 20 will crumple more easily than the inside portion will.

Figure 3A:
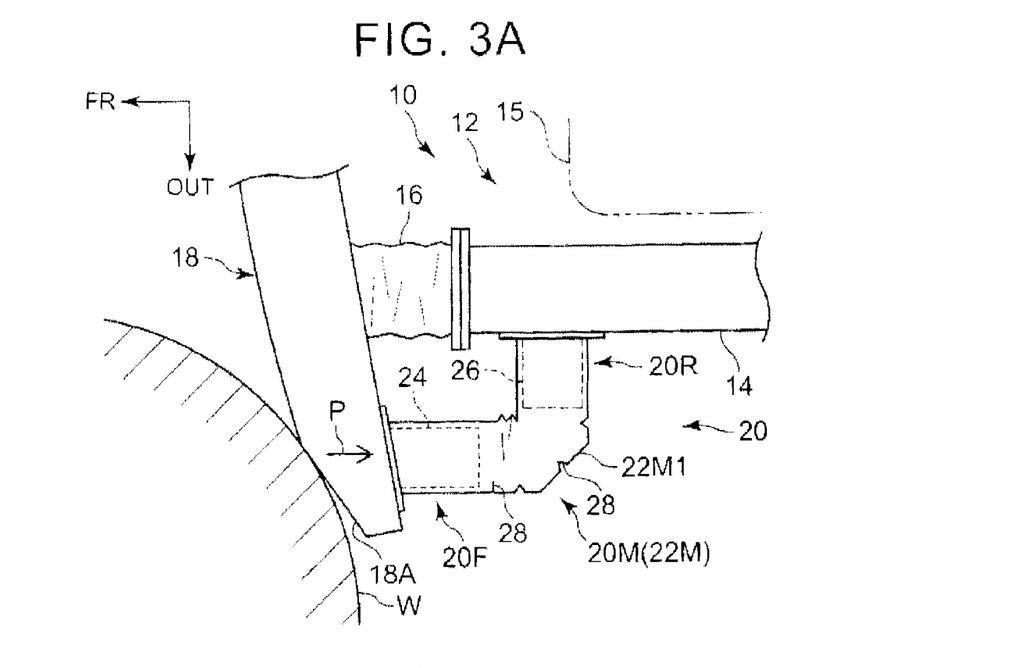
FIG. 3A is a plan view clan example of deformation of the load transmitting member when a short overlap collision occurs.

Therefore, when a colliding object W abuts against the extending portion 18A of the bumper reinforcement 18 when a short overlap collision occurs, as shown in FIG. 3A, for example, the following occurs. That is, a frontal collision load is input to the crush box 16 via the bumper reinforcement 18, and the frontal collision load P is input to the load transmitting member 20. Consequently, the crush box 16 crumples in the axial direction, and the intermediate portion 20M of the load transmitting member 20 crumples in the axial direction with the longitudinal beads 28 as the starting point.

Figure 3B:
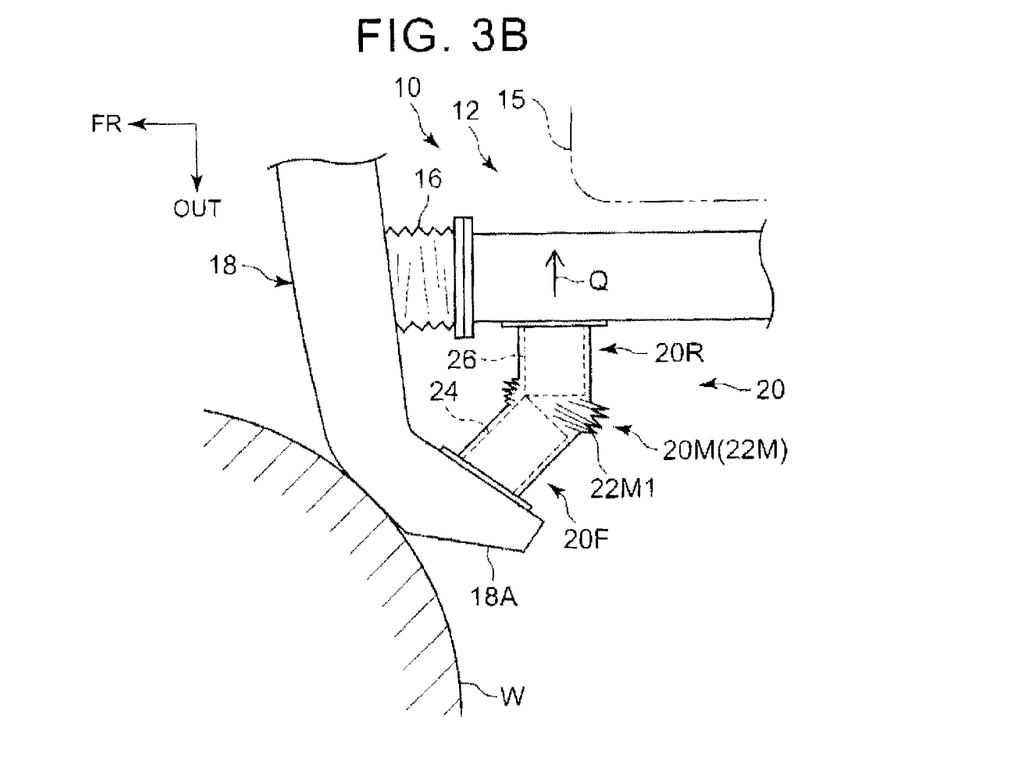
FIG. 3B is a plan view of an example of deformation of the load transmitting member when a short overlap collision occurs.

Next, when the colliding object W moves even farther toward the rear in the vehicle body front-rearward direction with respect to the bumper reinforcement 18, as shown in FIG. 3B, the crush box 16 axially compression-deforms even more in the axial direction, thus absorbing the impact energy. Meanwhile, at the intermediate portion 20M of the load transmitting member 20, the outside wall portion 22M1 of the connecting member 22 crumples even more with the longitudinal bead 28 as the starting point. Consequently, the pushing portion 20F of the load transmitting member 20 is guided toward the receiving portion 20R while rotating toward the inside in the vehicle width direction.

Then when the pushing portion 20F of the load transmitting member 20 abuts against receiving portion 20R, the frontal collision load P is transmitted toward the inside in the vehicle width direction to the front side member 14. That is, a load that pushes the front side member 14 toward the inside in the vehicle width direction (hereinafter, referred to as a "lateral load") Q is generated.

This lateral load Q causes the vehicle body front portion 12 to side away from the colliding object W in the vehicle width direction. As a result, deformation and the like of a cabin, not shown, formed to the rear of the power unit 15 in the vehicle body front-rearward direction is inhibited. Also, for example, the lateral load Q is dispersed and transmitted from the front side member 14 to a member on the side opposite the collision side via the power unit 15, by the front side member 14 bending and deforming toward the inside in the vehicle width direction with the receiving portion 20R as the starting point. As a result, deformation and the like of the cabin, not shown, formed to the rear of the power unit 15 in the vehicle body front-rearward direction is further inhibited.

In this way, with this example embodiment, the frontal collision load P is transmitted to the front side member 14 via the load transmitting member 20 when a short overlap collision occurs. Therefore, collision performance with respect to a short overlap collision is able to be improved.

Also, the pushing portion 20F and the receiving portion 20R are connected by the connecting member 22, and the pushing portion 20F is guided toward the receiving portion 20R by the intermediate portion 22M of the connecting member 22 deforming, i.e., by the intermediate portion 20M of the load transmitting member 20 deforming. As a result, the pushing portion 20F can be more reliably made to abut against the receiving portion 20R when a short overlap collision occurs. Therefore, the frontal collision load P can be more reliably transmitted to the front side member 14.

Furthermore, the impact energy is absorbed by the intermediate portion 20M of the load transmitting member 20 deforming. That is, the intermediate portion 20M of the load transmitting member 20 also serves as an energy absorbing portion. Therefore, the collision performance with respect to a short overlap collision is able to be improved even more.

Moreover, with this example embodiment, the pushing portion 20F and the receiving portion 20R are able to be provided on the load transmitting member 20 by a simple structure in which the front protruding portion 24B is inserted into the front end portion 22F of the connecting member 22, and the rear protruding portion 26B is inserted into the rear end portion 22R of the connecting member 22.

Also, with this example embodiment, the frontal collision load P is able to be promptly transmitted to the front side member 14 when a short overlap collision occurs, by providing the extending portion 18A on the bumper reinforcement 18 that is arranged on the front end side of the vehicle body front portion 12.

Next, a modified example of the example embodiment described above will be described.

In the example embodiment described above, the pushing portion 20F and the receiving portion 20R are provided on the load transmitting member 20 by inserting the front protruding portion 24B into the front end portion 22F of the connecting member 22, and inserting the rear protruding portion 26B into the rear end portion 22R of the connecting member 22, but the embodiment of the invention is not limited to this as long as the pushing portion 20F and the receiving portion 20R are rigid enough to transmit a frontal collision load by abutting against each other. Therefore, for example, the pushing portion 20F and the receiving portion 20R may be suitably reinforced by providing a bulkhead or a reinforcing rib as a reinforcing member that will be described later, inside the front end portion 22F and the rear end portion 22R of the connecting member 22. Also, a pushing portion and a receiving portion may also be provided on the connecting member 22 by reinforcing the outside of the load transmitting member 20.

Also, for example, the front end portion, the intermediate portion, and the rear end portion of the load transmitting member 20 may each be formed by separate members, and these separate members may be joined together to form a load transmitting member. More specifically, in the modified example shown in FIG. 4, an intermediate portion 30M of a load transmitting member 30 is formed by an intermediate member 32, and a rear end side of the load transmitting member 30 is formed by a rear member 34. The intermediate member 32 and the rear member 34 are both formed in a cylindrical shape having a generally rectangular cross-section, and are joined together by overlapping flange portions 32A and 34A with each other and then welding them together or bolting Them together with bolts, not shown, or the like. Although not shown, a front end portion of the load transmitting member 30 is formed by a member similar to the rear member 34.

Figure 4:
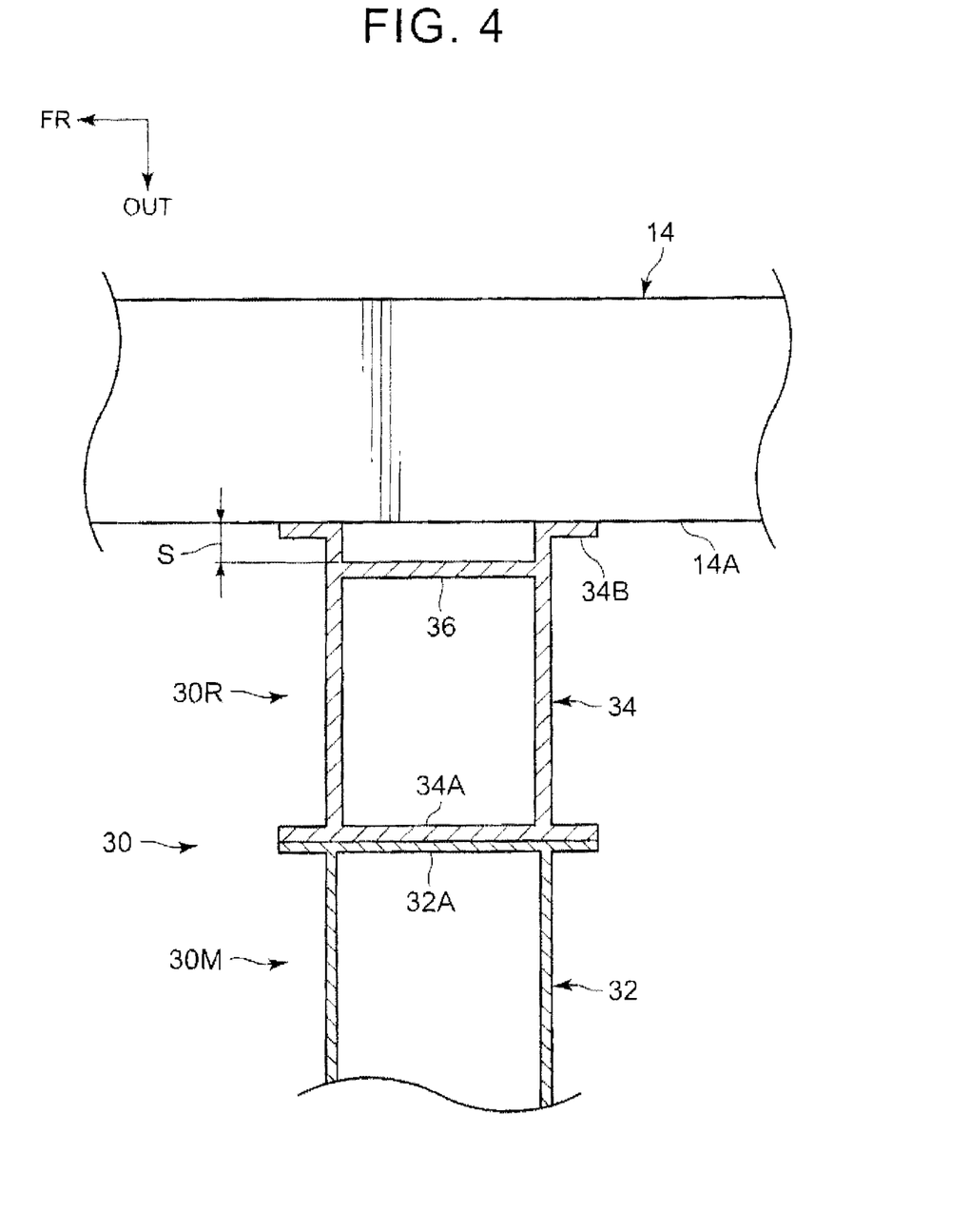
FIG. 4 is an enlarged top sectional view of a modified example of the load transmitting member according to the example embodiment of the invention.

The rear member 34 is fixed to the outside wall portion 14A of the front side member 14 via a flange portion 34B. Also, a bulkhead 36 that serves as one example of a reinforcing member is provided inside the rear member 34. The rear member 34 is reinforced by this bulkhead 36, and a receiving portion 30R is formed between the bulkhead 36 and the flange portion 32A of the intermediate member 32. A space S is formed between the bulkhead 36 and the outside wall portion 22M1 of the front side member 14, i.e., between the receiving portion 20R and the front side member 14. In this way, the space S is also able to be formed between the receiving portion 20R and the front side member 14.

Also, in the example embodiment described above, the longitudinal bead 28 as a weak portion are formed on the outside wall portion 22M1 of the intermediate portion 20M of the load transmitting member 20, but the embodiment of the invention is not limited to this. That is, a slit, notch, recessed portion, protruding portion, or through-hole may also be formed as the weak portion in a portion on the outside of the load transmitting member 20 in the vehicle width direction. Also, the configuration may be such that the front end side of the load transmitting member 20 is guided toward the rear end side of the load transmitting member 20, by setting a suitable rigidity difference between an inside portion and an outside portion of the intermediate portion 20M of the load transmitting member 20 in the vehicle width direction, not by forming a weak portion on this intermediate portion 20M. In this way, some possible methods for setting the rigidity difference between the inside portion and the outside portion of the intermediate portion 22M of the load transmitting member 20 include, for example, relatively reducing the rigidity of the outside portion by making the outside portion thinner than the inside portion, and relatively reducing the rigidity of the outside portion by reinforcing the inside portion.

Also, in the example embodiment described above, the load transmitting member 20 is bent in an L-shape when viewed from above, but the embodiment of the invention is not limited to this. That is, the shape of the load transmitting member 20 may be modified as appropriate.

Also, in the example embodiment described above, the bumper reinforcement 18 and the extending portion 18A are integrally formed, but the embodiment of the invention is not limited to this. For example, an extension member as an extending portion that extends farther to the outside than the front side member 14 in the vehicle width direction may be provided on an end portion of the bumper reinforcement 18, and this extension member and the front side member 14 may be joined together by the load transmitting member 20.

Also, in this example embodiment, the extending portion 18A is provided on the bumper reinforcement 18, but the embodiment of the invention is not limited to this. That is, the extending portion may also be provided between the bumper reinforcement 18 and the crush box 16, on the crush box 16 itself, or on the front side member 14 or the like, for example.

Also, in the example embodiment described above, the extending portion 18A is provided on both end portions of the bumper reinforcement 18, but the extending portion 18A may be provided on at least one end portion of the bumper reinforcement 18. That is, the extending portion may be provided on at least one of the two side portions of the vehicle body front portion 12. To elaborate Further, in the example embodiment described above, the vehicle body front portion 12 is formed bilaterally symmetrical with respect to the center portion in the vehicle width direction, but the vehicle body front portion 12 may also be bilaterally asymmetrical with respect to the center portion in the vehicle width direction.

While the invention has been described with reference to example embodiments thereof, it is to be understood that the embodiment of the invention is not limited to the described embodiments. The example embodiment and various modified examples may also be used in any suitable combination. The invention may of course be carried out in any of a variety of modes within the scope of the invention.

What is claimed is:

1. A vehicle body front structure comprising:
   a front side member that is arranged on a side portion of a vehicle body front portion, and extends in a vehicle body front-rearward direction;
   an extending portion that extends farther toward an outside in a vehicle width direction than the front side member;
   a load transmitting member that connects the extending portion and the front side member together, and is configured such that a front end side of the load transmitting member is guided toward a rear end side of the load transmitting member by an intermediate portion of the load transmitting member deforming in response to a load toward a rear side in the vehicle body front-rearward direction, the load transmitting member is a closed sectional structure, wherein
   a weak portion that becomes a starting point for deformation is formed on a portion on the outside, in the vehicle width direction, of the intermediate portion of the load transmitting member;
   a receiving portion is provided on the rear end side of the load transmitting member;
   a pushing portion that is guided toward the receiving portion is provided on the front end side of the load transmitting member, the pushing portion pushing the receiving portion toward an inside in the vehicle width direction; and
   the receiving portion and the pushing portion are a reinforcing member provided inside the load transmitting member.

2. The vehicle body front structure according to claim 1, wherein
   the rear end side of the load transmitting member is positioned to the rear side in the vehicle body front-rearward direction, and to an inside in the vehicle width direction, with respect to the front end side of the load transmitting member.

3. The vehicle body front structure according to claim 1, wherein
   the extending portion is provided on a bumper reinforcement that is arranged on a vehicle body front end side and extends in the vehicle width direction.

4. A vehicle body front structure comprising:
   a front side member that is arranged on a side portion of a vehicle body front portion, and extends in a vehicle body front-rearward direction;
   an extending portion that extends farther toward an outside in a vehicle width direction than the front side member;
   a load transmitting member that connects the extending portion and the front side member together, a weak portion that becomes a starting point for deformation being formed on a portion on an outside, in the vehicle width direction, of an intermediate portion of the load transmitting member, the load transmitting member is a closed sectional structure;
   a receiving portion is provided on the rear end side of the load transmitting member;
   a pushing portion that is guided toward the receiving portion is provided on the front end side of the load transmitting member, the pushing portion pushing the receiving portion toward an inside in the vehicle width direction; and
   the receiving portion and the pushing portion are a reinforcing member provided inside the load transmitting member.

5. The vehicle body front structure according to claim 4, wherein
   the extending portion is provided on a bumper reinforcement that is arranged on a vehicle body front end side and extends in the vehicle width direction.

* * * * *